United States Patent [19]

Fukumochi et al.

[11] Patent Number: 5,001,633
[45] Date of Patent: Mar. 19, 1991

[54] COMPUTER ASSISTED LANGUAGE TRANSLATING MACHINE WITH SENTENCE EXTRACTING FUNCTION

[75] Inventors: Yoji Fukumochi; Hitoshi Suzuki; Shuzo Kugimiya, all of Nara; Ichiko Nakamura, Soraku; Tokuyuki Hirai, Yamatokoriyama, all of Japan

[73] Assignee: Sharp Kabushiki Kaisha, Osaka, Japan

[21] Appl. No.: 397,188

[22] Filed: Aug. 23, 1989

[30] Foreign Application Priority Data

Sep. 2, 1988 [JP] Japan ................................. 63-220715

[51] Int. Cl.$^5$ ............................................. G06F 15/38
[52] U.S. Cl. ..................................................... 364/419
[58] Field of Search ................. 364/419, 200 MS File, 364/900 MS File

[56] References Cited

U.S. PATENT DOCUMENTS 4,787,038 11/1988 Doi et al. ............................ 364/419

FOREIGN PATENT DOCUMENTS 0168077 7/1986 Japan .
0223977 10/1986 Japan .

Primary Examiner—Jerry Smith
Assistant Examiner—David Huntley

[57] ABSTRACT

A computer assisted language translating machine receives source language text from a communication appliance, such as a telex machine, and serially stores the text in a first storage unit. After a predetermined time, character data is read out from the first storage unit and transferred to a second storage unit. A discriminating device determines whether the character data read out of the first storage unit is a period, and whether a space follows the period. In the event a period and space are detected, the sentence associated with the period is translated.

4 Claims, 3 Drawing Sheets

COMPUTER ASSISTED LANGUAGE TRANSLATING MACHINE WITH SENTENCE EXTRACTING FUNCTION

BACKGROUND OF THE INVENTION

1. Field of the Invention

The present invention relates to a computer assisted language translating machine and, more particularly, to a translating machine capable of accomplishing a real-time translation of an original text received from a communication appliance such as, for example, a telex machine.

2. Description of the Prior Art

Where an original text in a source language, for example, English, received by a communication appliance is translated into a translated version in a target language, for example, Japanese, with the use of the computer assisted language translating machine, an operator of the translating machine has to manually input a message, received by the communication appliance and representing the original text, through a keyboard arrangement into the translating machine. Alternatively, the translating machine can be connected with the communication appliance so that the translating machine can receive the transmitted message directly from the communication appliance and, in such case, the transmitted message has to be temporarily stored in a system storage file. When the message stored in the system storage file is to be translated, the operator has to undergo a time-consuming manipulation to call the message from the storage file and then to enter it in a translation module in the translating machine.

Either the entry of the original text into the translating machine or the withdrawal of the received message from the system storage file for the entry thereof into the translating machine requires manual intervention. Accordingly, the prior art method is ineffective to accomplish a real-time translation of the message in one source language into a translated version in a target language different from the source language.

SUMMARY OF THE INVENTION

The present invention has been developed with a view to substantially solving the above described disadvantages and has for its essential object to provide an improved computer assisted language translating machine capable of accomplishing a real-time translation of a message in a source language, received from a communication appliance, into a translated version in a target language.

According to the present invention, there is provided a computer assisted language translating machine which comprises a morpheme analyzer for separating a source language sentence, transmitted from a communication appliance, into morphemes to provide information including parts of speech of the morphemes with the use of at least a fixed main dictionary; a syntax analyzer for analyzing the syntax of a string of the morphemes, which have been separated by the morpheme analyzer, with the use of a dictionary and grammatical rules; a converter for converting a syntactic structure of the input sentence analyzed by the syntax analyzer, into a syntactic structure of the target language; and a sentence generator for generating a translated sentence according to the syntactic structure of the target language converted by the converter.

To accomplish the above described object of the present invention, the computer assisted language translating machine also comprises a first storage unit for storing character data forming the source language sentence; character data writing means for sequentially writing the character data in the order in which the character data are inputted from the communication appliance; character data reading means for reading the character data from the first storage unit in the order, in which the character data are sequentially stored in the first storage unit, after a predetermined time subsequent to the writing of the character data into the first storage unit; a second storage unit for storing the character data read out by the character data reading means from the first storage unit; discriminating means for determining whether or not the character data read out by the character data reading means represents the end of one sentence; and translation starting means operable, when the discriminating means indicates that the character data read out represents the end of one sentence, to initiate a translation with respect to the character data representative of such one sentence and stored in the second storage unit.

According to the present invention, when the character data representing the sentence received from the communication appliance is inputted, the character data are sequentially written into the first storage unit in the order in which the character data have been inputted. Subsequently, after the passage of the predetermined time subsequent to the writing of the character data into the first storage unit performed by the character writing means, the character data written in the first storage unit are read out by the character data reading means in the order, in which they have been written, for the storage into the second storage means. At this time, the discriminating means determines whether or not the character data read out by the character data reading means represent the end of one sentence. Should the discriminating means determine that the character data representative of the end of one sentence have been read out, the translation starting means initiates the translation with respect to the character data representative of such one sentence and stored in the second storage means.

Then, when the source language sentence is inputted in the morpheme analyzer, the source language sentence is separated into a strings of morphemes to provide information including the parts of speech. The syntactic structure of the morpheme strings is then analyzed by the syntax analyzer with the use of the dictionary and the grammatical rules and is subsequently converted by the converter into a syntactic structure of the target language. The syntactic structure of the target language is utilized by the sentence generator for generating a translated sentence according to such syntactic structure of the target language.

Accordingly, when the character data of the source language sentence received from the communication appliance is inputted, a translation thereof into the target language is automatically executed sentence by sentence.

Further scope of applicability of the present invention will become apparent from the detailed description given hereinafter. However, it should be understood than the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This and other objects and features of the present invention will become apparent from the following description taken in conjunction with a preferred embodiment thereof with reference to the accompanying drawings which are given by way of illustration only, and thus are not limitative of the present invention, and in which like parts are designated by like reference numerals and in which.

DETAILED DESCRIPTION OF THE PREFERRED EMBODIMENT

Figure 1:
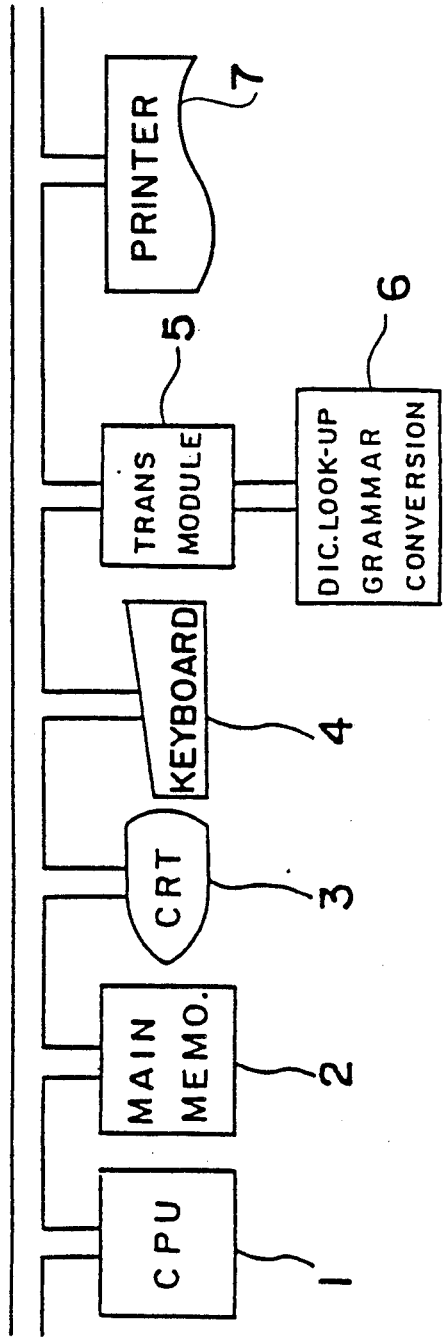
FIG. 1 is a block diagram of a preferred embodiment of a computer assisted language translating machine according to the present invention.

Referring to FIG. 1, a block diagram of a computer assisted language translating machine according to the present invention is shown. The translating machine comprises a main CPU (central processing unit) 1, a main memory 2, a CRT 3 (cathode ray tube), a keyboard 4, a translation module 5, a memory device 6 storing dictionaries, grammatical rules and tree structure conversion rules for translation, and a printer 7 for providing a visible output representative of a result of translation performed by the computer assisted language translating machine.

When a source language text is inputted to the translation module 5, the translation module 5 translates and outputs a target language counterpart. Specifically, the source language text entered from keyboard 4 is transferred to the translation module 5 under the control of the main CPU 1. The translation module 5 makes use of grammatical rules and tree structure conversion rules stored in the memory 6 to translate the inputted source language text into the target language counterpart as will be described later. The result of this translation is outputted to the printer to provide a translated version of the source language text. The translated version may also be displayed on the CRT 3.

Figure 2:
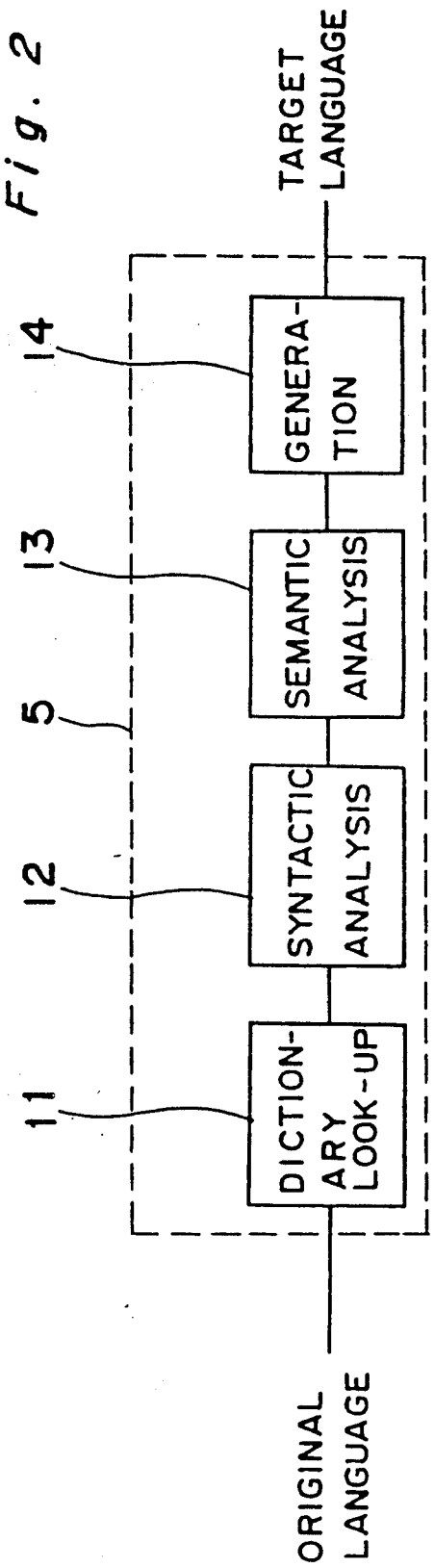
FIG. 2 is an operating structure diagram of a translation module according to the preferred embodiment.

FIG. 2 illustrate a specific structure of the translation module 5 used in the practice of the preferred embodiment of the present invention.

When the source language sentence is inputted in the morpheme analyzer 11, the morpheme analyzer 11 makes use of the dictionary stored in the memory 6 to separate the source language sentence into a strings of morphemes (word string) to provide information including the parts of speech of each of words forming the source language sentence, information on the grammar and translations of each word and also to analyze tense, person and number. The syntactic structure of the morpheme strings is then analyzed by the syntax analyzer 12 which makes use of the grammatical rules and the dictionary to determine a syntax analysis tree structure determinative of the relationship between the individual words forming the sentence.

The converter 13 makes use of the tree structure conversion rules stored in the memory 6 to convert the structure of the syntax analysis tree for the source language sentence to the structure of the target language sentence. The sentence generator 14 applies the Japanese postpositional article and auxiliary verbs appropriate to the Japanese translation, the resultant translation being outputted from the translation module 5 to the printer 7.

Figure 3:
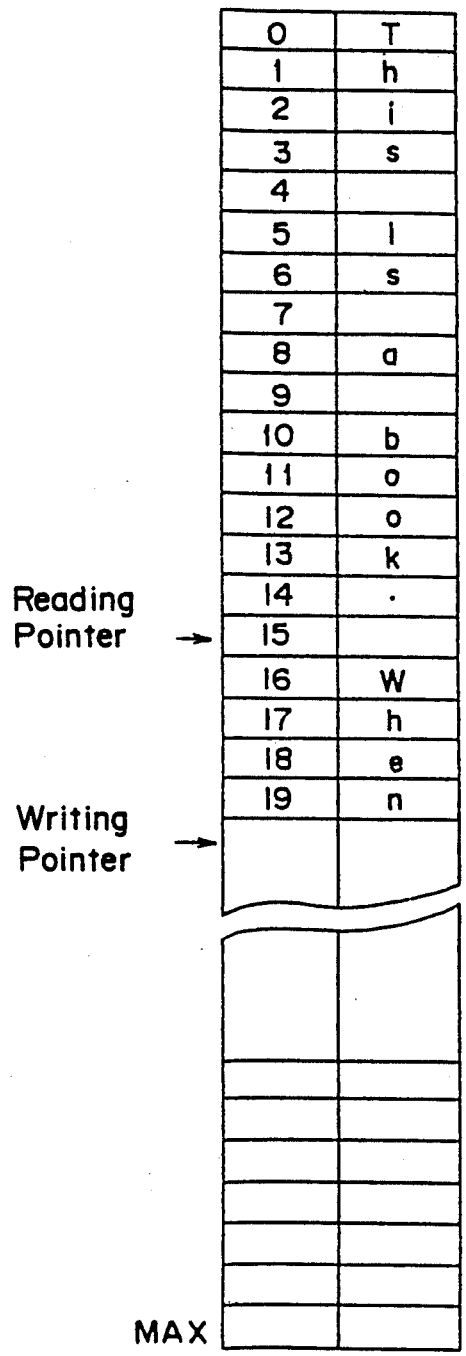
FIG. 3 is a diagram showing the contents stored in a buffer A.

FIG. 3 illustrates the structure of a buffer A for the storage of character date comprising the source language text transmitted from the communication appliance such as, for example a telex machine. The buffer A is adapted to store character data representative of each character at a location specified by a writing pointer which is incremented at the time of writing the character data. When reading the written character data out from the buffer A, the character representative of each character is read out from the location specified by a reading pointer which is incremented at the time of reading the character data.

Figure 4:
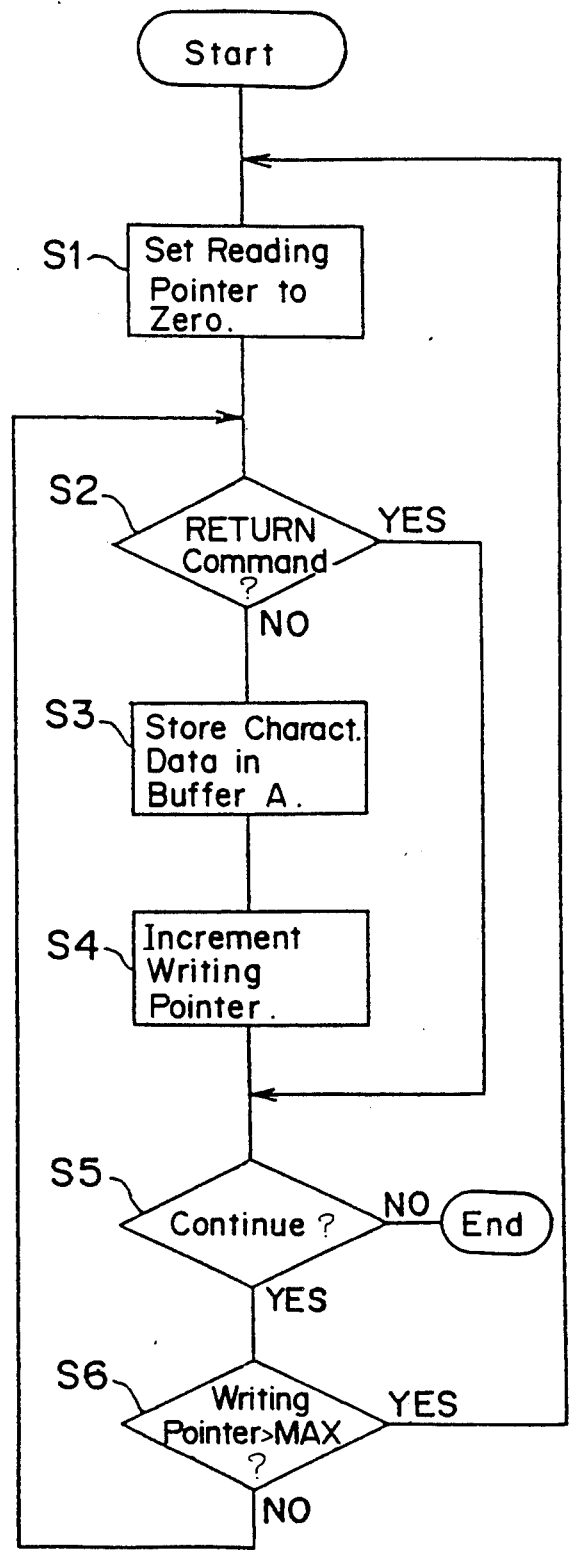
FIG. 4 is a flowchart showing the sequence of operation for storing character data.
Figure 5:
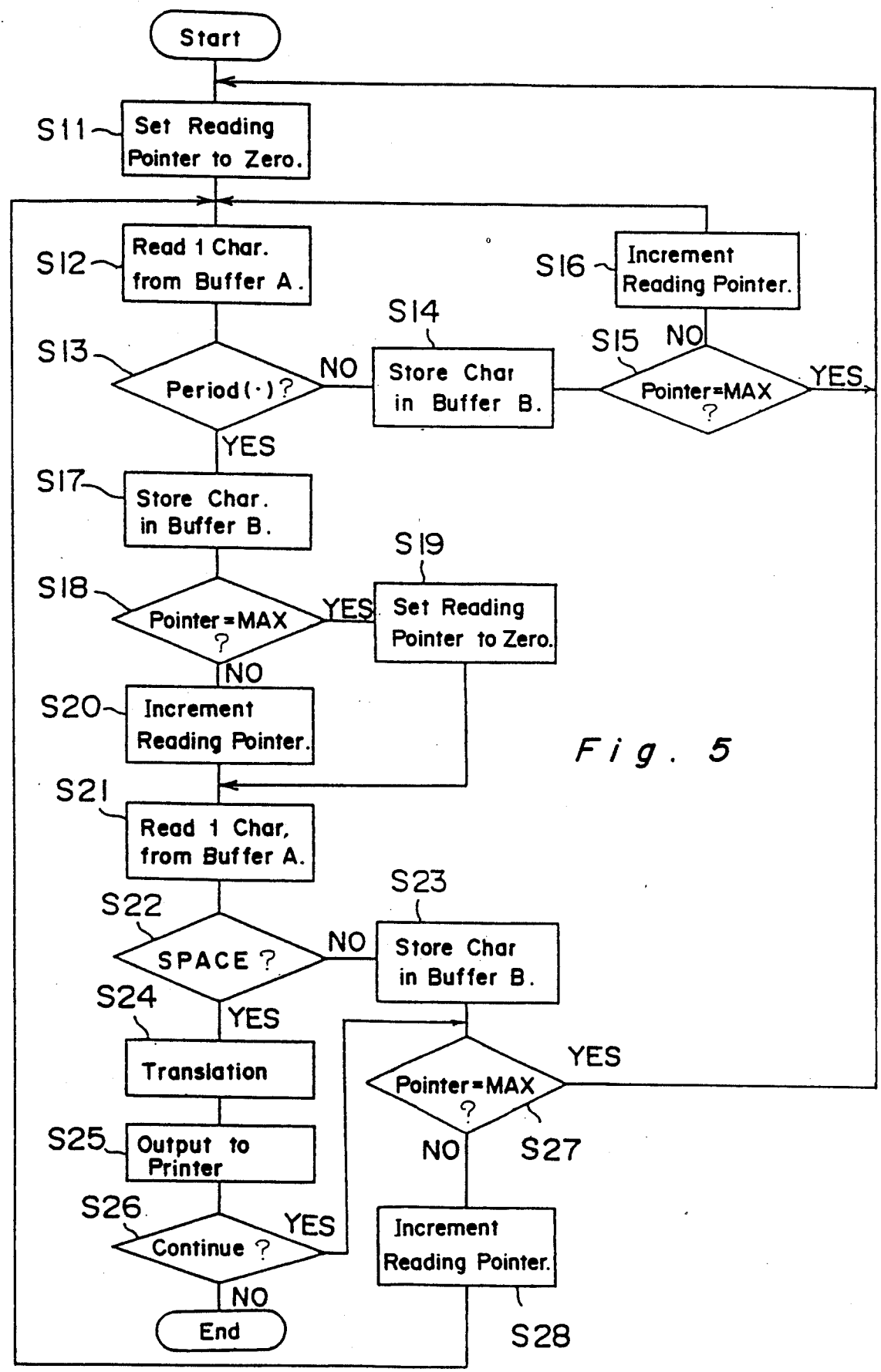
FIG. 5 is a flowchart showing the sequence of reading and translating data inputted from a communication appliance.

FIG. 4 illustrates a flowchart showing the sequence of operation for storing character data and FIG. 5 illustrates a flowchart showing the sequence of reading and translating data inputted from a communication appliance.

Hereinafter, a process for the real-time translation according to the preferred embodiment of the present invention will now be described with particular reference to FIGS. 3 to 5. Referring first to FIG. 4, at step Sl, the writing pointer indicating the location in the buffer A at which the character data is to be stored is zeroed for initializing the character data storage buffer A. Then, at step S2, and when the character data are transmitted from the communication appliance such as the telex machine, a decision is made to determine if one character data so inputted represents character data indicative of a RETURN data (line-begin command). If a result of decision at step S2 indicates that the character data represents the RETURN data, the program flow proceeds to step S5, but if it does not, the program flow proceeds to step S3.

At step S3, the character data so inputted is written in the buffer A a the location specified by the writing pointer and, thereafter, the writing pointer is incremented at step S4.

At step S5, a decision is made to determine if the character storage process should be continued. Where it should be continued, the program flow proceeds to step S6, but if it should not, the character data storage process is terminated.

At step S6, a decision is made to determine if the writing pointer is greater than MAX (indicative of the last location for the storage of the character data in the buffer A). In the event that the writing pointer is greater than Max, it means that the buffer A is full of the character data and, therefore, the program flow return to step Sl to reset the writing pointer to zero. On the other hand, if the writing pointer is not greater than Max, the program flow returns to step S2 to continue the character data storage process for the next succeeding character data.

On the other hand, when the storage of the character data representative of the source language text into the buffer A is initiated in the manner as hereinabove described, the reading of the character data so stored in the buffer A takes place after a predetermined time subsequent to the initiation of the storage of the character data representative of the source language text. Hereinafter, the sequence of reading and translating data inputted from the communication appliance will be described with reference to FIG. 5.

At step S11 the reading pointer is set to zero, followed by step S12 at which the character data corresponding to one character is read out from the location of the buffer A specified by the reading pointer. At step S13, a decision is made to determine if the character data corresponding to one character read from the buffer A represents a character data indicative of a period (.). Should it represent the period, the program flow proceeds to step S17, but should it not represent the period, the program flow proceeds to step S14.

At step S14, the character data corresponding to one character read out at step S12 is stored in a buffer B, not shown, for the storage of a source language from which translation should be made. Then, at step S15, a decision is made to determine if the reading pointer is equal to MAX. If it is equal to MAX, the program flow return to step S11, but if it is not, the program flow proceeds to step S16.

At step S16, the reading pointer is incremented, followed by step S12.

At step S17, the character data representative of the period read out is stored in the buffer B. Then, at step S18, a decision is made to determine if the reading pointer is equal to MAX. If it is equal to MAX, the program flow proceeds to step S20.

At step S19, the reading pointer is set to zero, followed by step S21.

At step S20, the reading pointer is incremented, followed by step S21.

At step S21, the character data corresponding to one character is read out from the location of the buffer A specified by the reading pointer, followed by step S22 at which the character data so read out is examined as to whether or not it represents a space. If it represents the space, the program flow proceeds to step S24, but if it does not, the program flow proceeds to step S23. At step S23, the character date corresponding to one character read out in the manner as hereinabove described is stored in the buffer B and, thereafter, step S27 takes place.

Since the character data representative of the period (.) has been read out at step S12 and the character data representative of the space has also been read out at step S21, all of the character data corresponding to one sentence are determined as read out from the buffer A and subsequently stored in the buffer B and, accordingly, the translation of the character data so stored in the buffer B is initiated at step S24.

With the translation process so initiated, the character data corresponding to one sentence referred to above are inputted to the translation module 5 under the control of the main CPU 1 for the translation thereof into the target language.

At subsequent step 25, the resultant translation given at step S24 is outputted to the printer 7 to provide printed output of the resultant translation of one sentence, thereby completing one cycle of translation process.

At step S27, a decision is made to determine if the reading pointer is equal to MAX. If it is equal to MAX, the program flow return to step S11 to set the reading pointer to zero, but if it is not, the program flow proceeds to step S28 at which the reading pointer is incremented and the program flow subsequently return to step S12 to read the character data corresponding to the next succeeding one sentence out from the location of the buffer A specified by the reading pointer.

Thus, according to the present invention, when the character data representative of the sentence in the source language is inputted from the communication appliance such as the telex machine, the character data are temporarily stored in the buffer A thereby avoiding any possible loss of a portion of the character data transmitted directly from the communication appliance. Simultaneously therewith, the input of the character data from the communication appliance provides a cue with which the reading process for reading the character data stored in the buffer A is automatically started after the predetermined time. Then, the end of one message is automatically recognized and a translation program stored in the translation module is started to execute the translation without requiring the intervention of the operator.

According to the present invention, it is possible to accomplish the real-time translation once the source language message received by the communication appliance is inputted to the translating machine.

Thus, from the foregoing description, it is clear that, when the character data representing the sentence received from the communication appliance is inputted, the character data are sequentially written into the first storage unit. The character data written in the first storage unit are subsequently read out by the character data reading means. At this time, the discriminating means determines whether or not the character data read out by the character data reading means represent the end of one sentence and, in the event that the discriminating means determine that the character data representative of the end of one sentence have been read out, the translation starting means initiates the translation with respect to the character data representative of such one sentence and stored in the second storage means. Accordingly, when the character data of the source language sentence received from the communication appliance is inputted, a translation thereof into the target language is automatically executed sentence by sentence.

Although the present invention has been fully described in connection with the preferred embodiment thereof with reference to the accompanying drawings, it is to be noted that various changes and modifications are apparent to those skilled in the art. For example, although in describing the preferred embodiment of the present invention, reference has been made to the example wherein the English sentence is translated into Japanese, the concept of the present invention can be equally applicable to a translation of Japanese, or any other source language, into English or any other target language linguistically different from the source language. Such changes and modifications are to be understood as included within the scope of the present invention as defined by the appended claims unless they depart therefrom.

What is claimed is:

1. A computer assisted language translating machine comprising:
    a morpheme analyzer for separating a source language sentence, transmitted from a communication appliance, into morphemes to provide information including parts of speech of the morphemes by using at least a fixed main dictionary;

a syntax analyzer for analyzing syntax of a string of morphemes, which have been separated by the morpheme analyzer, with the use of a dictionary and grammatical rules;

a converter for converting a syntactic structure of the source language sentence, analyzed by the syntax analyzer, into a syntactic structure of a target language;

a sentence generator for generating a translated sentence according to the syntactic structure of the target language converted by the converter;

a first storage unit for storing character data forming the source language sentence;

character data writing means for sequentially writing character data into the first storage unit in the order inn which the character data are inputted from the communication appliance;

character data reading means for automatically reading the character data from the first storage unit in the order in which the character data are sequentially stored in the first storage unit, after a predetermined time subsequent to the writing of the character data into the first storage unit;

a second storage unit for storing the character data read out by the character data reading means from the first storage unit;

discriminating means for determining whether the character data read out by the character data reading means represents an end of one sentence; and translation starting means for initiating a translation in response to the discriminating means indicating the character data read out represents the end of one sentence, said translation starting means initiating translation of the character data representative of such one sentence and stored in the second storage unit.

2. The computer assisted language translating machine as recited in claim 1, wherein the communication appliance for transmitting the source language sentence is a telex machine.

3. The computer assisted language translating machine as recited in claim 1, further comprising display means for displaying the translation of the source language sentence in the target language.

4. A method for transmitting and translating a source language sentence to a target language comprising the steps of:

providing a first buffer and a second buffer, said first buffer having a writing pointer and a reading pointer;

initializing the writing pointer to thereby indicate where character data is to be stored in the first buffer;

transmitting character data in a source language from a communication appliance to the first buffer;

determining whether one character data of transmitted data is a line-begin command and until encountering the line-begin command, storing the character data in the first buffer and incrementing the writing pointer for each stored character data;

determining whether to continue storage of data when a line-begin command is encountered;

determining whether to continue storage of data after input of each character data to the first buffer;

resetting the writing pointer to a first data storage location in the first buffer when a last location for data storage is reached in the first buffer;

reading data automatically from the first buffer after a predetermined period of time and initializing the reading pointer before the reading of data begins;

determining whether a read character data represents a period;

storing the read character data in the second buffer until a period is encountered in the read character data;

incrementing the reading pointer for each character data stored n the second buffer;

resetting the reading pointer to the first data storage location when the last location for data storage is reached in the first buffer;

reading character data from the second buffer when a period is encountered in the read character data;

determining whether a character data read from the second buffer represents a space;

translating a string of read character data encountered before the space, said string forming a source language sentence, the translating further analyzing parts of speech and syntax of the source language sentence and converting a syntactic structure of the source language sentence into a syntactic structure of the target language; and generating a sentence in the target language according to the syntactic structure of the target language.

* * * * *